UNITED STATES PATENT OFFICE.

RICHARD BLAIR EARLE AND LUCAS PETRON KYRIAKIDES, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING ISOPRENE.

1,070,120.      Specification of Letters Patent.      Patented Aug. 12, 1913.

No Drawing.      Application filed November 11, 1911. Serial No. 659,826.

*To all whom it may concern:*

Be it known that we, RICHARD B. EARLE and LUCAS P. KYRIAKIDES, citizens of the United States, residing at Boston, Massachusetts, have invented certain new and useful Improvements in Processes of Producing Isoprene, of which the following is a specification.

Our invention relates to a new and valuable process for producing isoprene (2 methylbutadiene 1, 3; β methyldivinyl) which is a valuable hydrocarbon useful in the preparation of rubber or terpenes.

The new process consists in passing the vapors of isoamylene oxid of the formula:

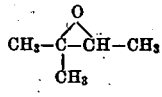

over dehydrating catalytics, such as aluminum silicate, heated to temperatures from 400° to 600° C., at pressures less than 60 millimeters of mercury.

In order to illustrate the new process more fully the following example is given: Amylene oxid is distilled slowly over aluminum silicate, either powdered or in briquet form, which is kept at a temperature of 450° C., and a pressure of one millimeter of mercury by a vacuum pump. The products of the reaction are condensed in suitable receivers by means of refrigerating agents, and purified by fractional distillation.

The fraction boiling from 32°–37° C. consists of nearly pure isoprene and may be used in this form. The other products of the reaction are high boiling products of unknown nature, methylisopropyl ketone and traces of trimethylethylene.

The yield of isoprene, containing only traces of trimethylethylene, is over 70% of the theory.

The formation of isoprene takes place by the splitting off of water according to the equation:

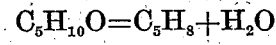

The process is useful at the ordinary pressure but the yield of isoprene is largely increased by carrying out the operation *in vacuo*.

We claim:

1. A process for producing isoprene, which comprises passing the vapors of isoamylene oxid of the formula

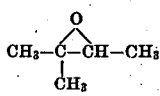

over a heated dehydrating catalytic agent and separating the isoprene formed from the other products.

2. A process for producing isoprene, which comprises passing the vapors of isoamylene oxid of the formula

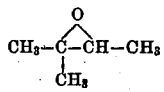

over a dehydrating catalytic agent heated to a temperature between 400° and 600° C. and separating the isoprene formed from the other products.

3. A process for producing isoprene, which comprises passing the vapors of isoamylene oxid of the formula

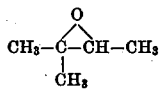

over a heated dehydrating catalytic agent at less than atmospheric pressure, and separating the isoprene formed from the other products.

4. A process for producing isoprene, which comprises passing the vapors of isoamylene oxid of the formula

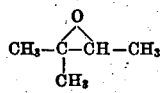

over heated aluminum silicate, at less than atmospheric pressure and separating the isoprene formed from the other products.

5. The process for producing isoprene which consists in passing the vapors of isoamylene oxid of the formula

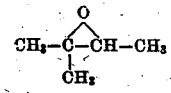

over heated dehydrating catalytics at temperatures from 400°–600° C. *in vacuo*, at pressures less than 60 millimeters of mercury.

6. The process for producing isoprene which consists in passing the vapors of isoamylene oxid of the formula

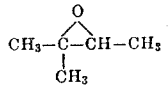

over heated aluminum silicate at temperatures from 400° to 600° C. *in vacuo*, at pressures less than 60 millimeters of mercury.

In testimony whereof we affix our signatures in presence of two witnesses.

RICHARD BLAIR EARLE.
LUCAS PETRON KYRIAKIDES.

Witnesses:
  JESSIE R. MOTT,
  M. ALICE HAGARTY.